United States Patent [19]

Kamiyama

[11] Patent Number: 4,549,517
[45] Date of Patent: Oct. 29, 1985

[54] FUEL SUPPLY DEVICE FOR INTERNAL COMBUSTION ENGINES

[75] Inventor: Shuichi Kamiyama, Tokyo, Japan

[73] Assignee: Mikuni Kogyo Kabushiki Kaisha, Tokyo, Japan

[21] Appl. No.: 561,094

[22] Filed: Dec. 13, 1983

[30] Foreign Application Priority Data

Dec. 13, 1982 [JP] Japan .................. 57-218121
Dec. 13, 1982 [JP] Japan .................. 57-218122

[51] Int. Cl.$^4$ ............................... F02B 3/00
[52] U.S. Cl. ................... 123/478; 123/494; 123/488; 123/486
[58] Field of Search ............ 123/478, 488, 486, 494

[56] References Cited

U.S. PATENT DOCUMENTS

| | | | |
|---|---|---|---|
| 4,335,694 | 6/1982 | Mausner | 123/478 |
| 4,359,991 | 11/1982 | Stumpp | 123/494 |
| 4,418,673 | 12/1983 | Tominari | 123/478 |
| 4,470,396 | 9/1984 | Hasumi | 123/478 |

Primary Examiner—Ronald B. Cox
Attorney, Agent, or Firm—Lalos, Leeds, Keegan, Marsh, Bentzen & Kaye

[57] ABSTRACT

A fuel supply device for internal combustion engines comprising a computer having a memory which stores an air flow quantity characteristic related to a pressure difference between the up- and down-streams of a throttle valve, an air flow quantity to pass the throttle valve and the throttle valve opening degree. A throttle valve actuator is moved by the computer for controlling an air flow quantity to be supplied to an engine. A plurality of sets of throttle valve opening degrees, air flow quantities or pressure differences corresponding to a variety of combinations between a desired air flow quantity and the pressure difference, throttle valve opening degree or air flow quantity at the present time point are read out of memory on the basis of the air flow quantity characteristic, and by an interpolation process the desired throttle valve opening degree, the air flow quantity or pressure difference at the present time point is computed to thereby adjust the throttle valve so as to be in a desired opening degree, the throttle valve opening degree so that the air flow quantity is to be at a desired value or the throttle valve opening degree so that the pressure difference is at a desired value by the throttle valve actuator. This is done in order to enable to a proper supply of an air flow quantity always appropriate to the operating status of the engine without using an air flow sensor. In case the change from the air flow quantity at the present time point to a desired air flow quantity is large, the estimated value of throttle valve opening degree is calculated from the desired value of pressure difference and desired air flow quantity and the throttle valve opening degree is adjusted into this estimated value or desired value.

4 Claims, 13 Drawing Figures

FUEL SUPPLY DEVICE FOR INTERNAL COMBUSTION ENGINES

BACKGROUND OF THE INVENTION (a) Field of the invention

The present invention relates to a fuel supply device for internal combustion engines having an air supply quantity controlling system so formed that an air flow quantity to be supplied to an internal combustion engine is able to be controlled by an actuator operated with a computer.

(b) Description of the prior art

The air supply into an internal combustion engine for automobiles and the like is conventionally controlled by opening or shutting a throttle valve mechanically connected to an accelerator pedal through a movement transmitting mechanism by a driver depressing the accelerator pedal. By opening or shutting the throttle valve with an actuator of the electric, pneumatic, oil pressure or similar type, it is also thought to electrically detect the motion of the accelerator pedal, to calculate and process this detection signal by an electronic control unit such as a computer and the like, taking the operating state of the engine into consideration and to operate the actuator so as to be able to obtain an air flow quantity necessary for the internal combustion engine. By this sort of controlling mechanism, it is partly practised to hold the revolution speed constant in the idling operation and to the hold air-fuel ratio (A/F value) constant. Furthermore, it has been attempted to similarly control the air flow quantity in all operating conditions. However, in a fuel supply device of known air supply quantity controlling system, the air flow quantity passing the throttle valve provided with an actuator is able to be calculated and controlled with an air detecting means (for example, an air flow sensor) or with the actually measured value of air quantity according to the operating conditions of an internal combustion engine. By the way, the air flow sensor for automobiles has such inclination that the manufacturing is difficult and the formation is complicated because a high measuring accuracy is requested and, therefore, has such problems that the manufacturing cost increases, the responsiveness deteriorates because it is separately arranged from the engine body as it is easily under the influence of the intake system of the engine, a pressure loss is caused because it acts as a resistance in the air flow path, a large space is occupied by it and an increase of the weight of an automobile is introduced. On the other hand, in a system to determine an air flow quantity referring to an actually measured value from the operating condition of the internal combustion engine, for example from the intake manifold pressure and the number of revolutions of the engine, the air flow sensor having various defects as mentioned above is not needed. It is, however, difficult to adjust the air flow quantity so as to always maintain high accuracy because the influence of the irregularity of the properties of the engine and the change along the progress of time are large. Further, it is extremely problematic in practice that a great amount of the actually measured data is needed to be accumulated and controlled in accordance with the properties set up according to the kind and purpose of the engine. Furthermore, in the adjustment of air quantity at the A/F control, as the opening degree of the throttle valve is increased or decreased by a servomechanism so that the output value from the exhaust gas sensor is to be a desired value, it is not necessary to detect the adjusted quantity of air. This is, however, essentially different from the control of air quantity for controlling the engine output since the quantity of air to be adjusted is small and it brings forth no change to the engine of such a degree that a driver is able to feel heat.

SUMMARY OF THE INVENTION

The primary object of the present invention is to provide a fuel suppy device for internal combustion engines having an air supply quantity controlling system which is not under the influence of the difference of engine properties, simple in its formation, able to be manufactured with low cost, easily capable of high-speed control of air quantity and not in need of an air flow sensor.

This object is attained, according to the present invention, by providing a computer having a memory which stores an air flow quantity characteristic related to the pressure difference between the up- and downstreams of an throttle valve, the air flow quantity to pass the throttle valve and the throttle valve opening degree. An actuator adjusts the throttle valve opening degree by being moved by the computer to control the air flow quantity to be supplied to the internal combustion engine, the computer is read out and a plurality of values of throttle valve opening degree, a plurality of values of air flow quantity or a plurality of values of pressure difference from a desired air flow quantity and the abovementioned pressure difference at the present time point, the throttle valve opening degree at the present time point and the abovementioned pressure difference, or a desired air flow quantity and the throttle valve opening degree at the present time point, are computed by an interpolation process. The desired opening degree of the throttle valve, the air flow quantity at the present time point and the pressure difference at the present time point are thus computed. The throttle valve is adjusted to the computed desired opening degree or the throttle valve is adjusted so that the air flow quantity at the present time point computed is to be the desired air flow quantity or the throttle valve is adjusted so that the pressure difference at the present time point computed is to be the desired pressure difference in order to control an air flow quantity or the basis of the air flow quantity characteristic.

According to the preferred formation of the present invention, the abovementioned plurality of the throttle valve opening degrees are read out in response to the combinations between the maximum value of air flow quantity stored in the memory which are smaller than the desired value of air flow quantity, the maximum value of pressure difference memorized in the memory which are smaller than the pressure difference value at the present time point, the minimum value of air flow quantity memorized in the memory which are larger than the desired value of air flow quantity and the minimum value of pressure difference memorized in the memory which are larger than the pressure difference value at the present time point.

According to another preferred formation of the present invention, the above mentioned plurality of kinds of air flow quantity values are read out in response to the combinations between the maximum value of the opening degree of throttle valve memorized in the memory which is smaller than the value of the opening degree of throttle valve at the present time point, the maximum value of pressure difference memorized in the memory which is smaller than the value of pressure difference at the present time point, the minimum value of opening degree of throttle valve memorized in the memory which is larger than the value of the opening degree of throttle valve at the present time point and the minimum value of pressure difference memorized in the memory which is larger than the value of pressure difference at the present time point.

According to a still another preferred formation of the present invention, the abovementioned plurality of pressure difference values are read out in response to the combinations between the maximum value of air flow quantity memorized in the memory which is smaller than the desired value of air flow quantity, the maximum value of the opening degree of throttle valve memorized in the memory which is smaller than the value of the opening degree of throttle valve at the present time point, the minimum value of air flow quantity memorized in the memory which is larger than the desired value of air flow quantity and the minimum value of the opening degree of throttle valve memorized in the memory which is larger than the value of the opening degree of throttle valve at the present time point.

According to the present invention, as it is able to delete a comparatively large time delay and pressure loss which occur in a conventional system which measures the air flow quantity with the use of an air flow sensor and the throttle valve performs by itself a roll of an air flow sensor, the detection of air flow quantity does not have a time delay pneumatic-mechanically as well as mechanically. And, as a response delay time of a pressure difference sensor to detect the pressure difference and the processing time of the computer are within a degree able to be ignored, the control of air flow quantity is able to be effected with highspeed and stability and the control of air flow quantity at an transitional state is specially able to be effected with an extreme highspeed and accuracy. And, as all variables with respect to the control, that is, the air flow quantity, throttle valve opening degree and pressure difference are relevant to the throttle valve and not under the influence of the operating state of engine, they are able to be adapted without modifications to various sorts of engines of differenct exhaust volumes and preset properties and not under the influence of the change along the progress of time of the properties of engines.

According to a still another preferable formation of the present invention, in case the change from a first air flow quantity to a desired air flow quantity is large, the control of air flow quantity is done by firstly computing a desired pressure difference and then an estimate value of throttle valve opening degree from the computed desired value of pressure difference and desired value of air flow quantity and adjusting the opening degree of the throttle valve into the desired opening degree of the throttle valve or the abovementioned estimate value. Thereby, the air flow quantity to be supplied into the cylinder of an internal combustion engine is always able to be adjusted into a desired air flow quantity substantially without time delay.

This object and other objects of the present invention will become more apparent during the course of the following detailed description and appended claims.

DESCRIPTION OF THE PREFERRED EMBODIMENTS

Figure 1:
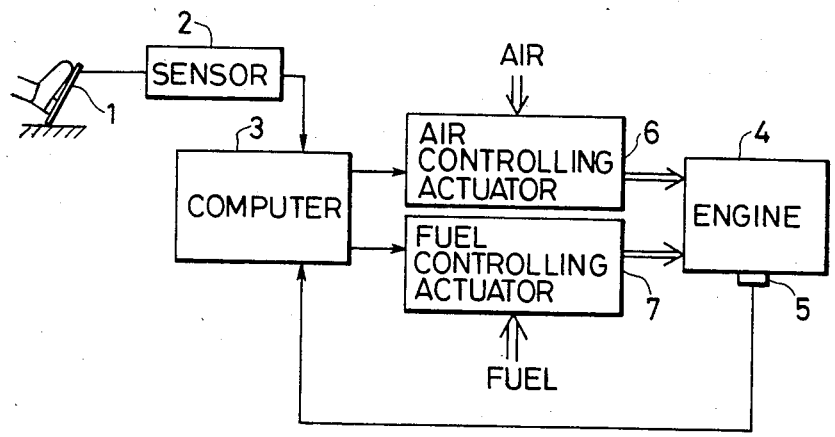
FIG. 1 is a schematic view of a fuel supply device adapting the air supply quantity control system according to the present invention.
Figure 2:
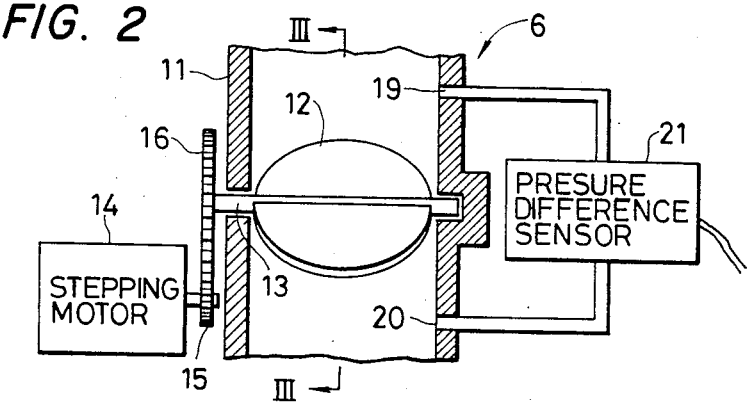
FIG. 2 is a sectional view showing an example of the air control actuator according to the present invention.
Figure 3:
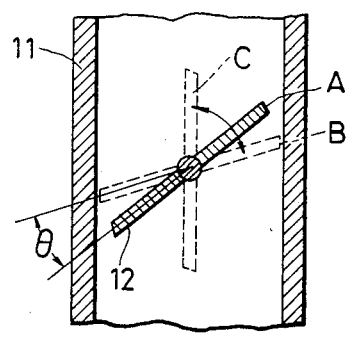
FIG. 3 is a sectional view along the III—III line of FIG. 2.
Figure 4:
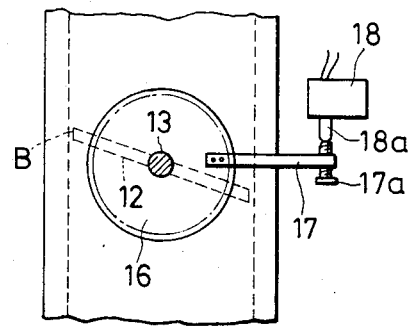
FIG. 4 is a schematic view showing the reference opening degree detecting mechanism.
Figure 5:
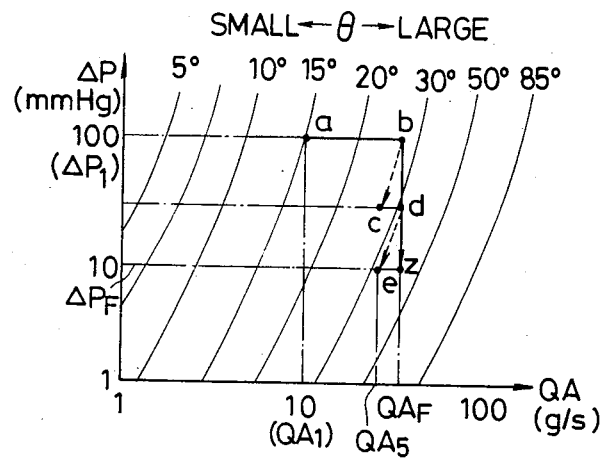
FIGS. 5, 8 and 9 are views showing the air flow quantity characteristics in the device according to the present invention.
Figure 6:
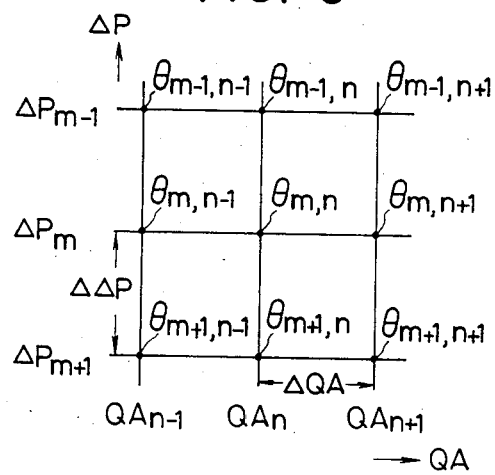
FIG. 6 is a diagram showing the map stored in the computer in case the control according to FIG. 5 is effected.
Figure 7:
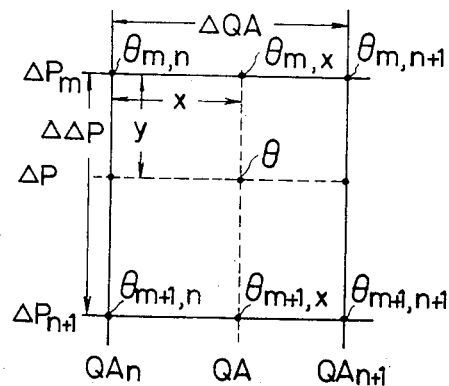
FIG. 7 is an explanatory view of an interpolation calculation based on the map shown in FIG. 6.

Referring to FIGS. 1 through 4, the numeral 1 is an accelerator pedal, 2 is a sensor to detect the depressed position of the accelerator pedal 1, 3 is a computer for receiving the electric signal generated by the sensor 2 in accordance with the depressed position of the accelerator pedal 1. Computer 3, also, receives the signals from a plurality of sensors 5 provided on an engine 4 for detecting the various operating status of the engine. Actuator 6 is an air controlling actuator to control the air flow quantity to be supplied within the engine 4, and 7 is a fuel controlling actuator to control the fuel to be supplied into the engine 4. FIGS. 2 through 4 show the details of the air controlling actuator 6 according to the present invention. The numeral 11 is an intake tube, 12 is a throttle valve fixed on a shaft 13 which is rotatably supported on the intake tube 11 within the intake tube 11. On the one end of the shaft 13 is attached a gear 16 to mesh with a gear 15 fixed on the shaft of a stepping motor 14. The throttle valve 12 is adapted to be adjusted in a predetermined opening degree by the movement of the stepping motor 14. By the way, the opening degree $\theta$ of the throttle valve 12 (the opening degree at the position A in FIG. 3) is an angle from the position B to the position A by taking the position just before the throttle valve 12 is completely closed as the reference opening degree 0°. Accordingly, the angle becomes $\theta$ max at the fully opened position. In case $\theta = 0°$ or at the position B, the air flow quantity is smaller than the minimum air flow quantity to be required for the engine. The reference opening degree position B is detected when a stop screw 17a of a lever 17 attached on the gear 16 contacts an operating pin 18a of a switch 18 as shown in FIG. 4. The reference opening degree can also be detected by an absolute position sensor, not shown, assembled inside the motor 14 or on the throttle shaft 13. By the way, in FIG. 4, the reference opening degree position B is adjustable by the stop screw 17a attached on the lever 17. Opening 19 is a pressure detection port provided on the upstream side of the throttle valve 12 of the intake tube 11, 20 is a pressure detection port provided on the downstream side of the throttle valve 12 of the intake tube 11, 21 is a pressure difference sensor connected to the two pressure detection ports 19 and 20 with a pressure transmitting pipe to detect the pressure difference ΔP and to output this in the form of an electric signal to the computer 3. The abovementioned air flow quantity characteristic of the throttle valve 12 is shown in FIG. 5, in which the abscissa represents the air flow quantity QA and the ordinate the pressure difference ΔP, respectively, in a logarithmic scale. In this case, the reference opening degree position B of the throttle valve 12 is inclined by 5° with respect to a plane perpendicular to the air flow path and therefore the angle $\theta$ comes to be $0° < \theta < 85°$.

Next, the operation of the abovementioned device shall be explained.

In FIG. 5, when ΔP=100 mmHg and $\theta = 15°$, QA=10 g/s (the point a). Since this is decided linearly, $\theta = 15°$ is necessary so that QA=10 g/s and ΔP=100 mgHg hold. Now, if the air flow quantity to be taken into the engine 4 has the value $QA_1$ at the point a (in this case, $\Delta P = \Delta P_1$ and $\theta = \theta_1$), the engine needs the air flow quantity $QA_F$ which is larger than the $QA_1$ when a driver depresses the accelerator pedal 1. However, as the pressure difference is $\Delta P_1$ when the accelerator pedal 1 is to be depressed, the opening degree of throttle valve 12 necessary at this moment is $\theta_2$ shown by the intersecting point b of $\Delta P_1$ with an air flow quantity of $QA_F$. But, when the opening degree of throttle valve 12 is opened from $\theta_1$ to $\theta_2$, the pressure difference becomes smaller to be $\Delta P_3$ (the point c) because the resistance in the flow path within the intake tube 11 decreases. Accordingly, the quantity of air flow actually passing the throttle valve 12 is $QA_3$ which is smaller than $QA_F$. Further, to realize the air flow quantity $QA_F$, the abovementioned operation is similarly repeated in the point d ($\Delta P_3, QA_F, \theta_4$), the point e ($\Delta P_5, QA_5, \theta_4$) and finally arrives at the point z ($\Delta P_F, QA_F, \theta_F$). As this calculation is effected using the computer 3, the time length from the measurement of the pressure difference to the completion of the calculation of the value of the throttle valve opening degree by which the predetermined throttle valve opening degree is adjusted by the air controlling actuator 6 is extremely short. Accordingly, the adjustment is not practically effected along the course shown by the point a →the point b→the point c→the point d ... but along the course shown by the point a→the point b→the point z as shown by the real line in FIG. 5.

By the way, such air flow quantity characteristic as shown in FIG. 5 is stored in the computer 3 but, as the values of pressure difference ΔP, air flow quantity QA and throttle valve opening degree $\theta$ are analogical values and their combinations are infinite, it is almost impossible to store all of them. Accordingly, in the computer 3, the pressure difference ΔP and the air flow quantity QA are digitally plotted as are the values of the throttle valve opening degree $\theta$ corresponding to the respective combinations between the values of the pressure difference and air flow quantity. This is hereinafter called $\theta$ map. Values of throttle valve opening degree corresponding to the combinations between the pressure difference and air flow quantity not existing in this $\theta$ map may be calculated by an interpolation. That is to say, when the desired pressure difference $\Delta P_F$ and air flow quantity $QA_F$ are between $\Delta P_m$ and $\Delta P_{m+1}$, $QA_n$ and $QA_{n+1}$ respectively, $Q_{m,x}$ and $Q_{m+1,x}$ are firstly obtained from the difference x between $QA_F$ and $QA_n$ by, for example, a proportional division and $\theta_F$ between $\theta_{m,x}$ and $Q_{m+1,x}$ is next obtained from the difference y between $\Delta P_F$ and $\Delta P_m$. Namely, $$\theta_{m,x} = \theta_{m,n} + (\theta_{m,n+1} - \theta_{m,n})\frac{x}{\Delta QA}$$

$$\theta_{m+1,x} = \theta_{m+1,n} + (\theta_{m+1,n+1} - \theta_{m+1,n})\frac{x}{\Delta QA}$$

$$\theta_F = \theta_{m,x} + (\theta_{m+1,x} - \theta_{m,x})\frac{y}{\Delta \Delta P}$$

Here, they are calculated from $\Delta QA = QA_{n+1} - QA_n$ and $\Delta\Delta P = \Delta P_{m+1} - \Delta P_m$. Accordingly, when the driver depresses the accelerator pedal 1, the position thereof is coupled to the computer 3 by the sensor 2. The computer 3 computes the proper throttle valve opening degree $\theta_F$ from the pressure difference and air flow quantity coupled from the sensors 5 provided on the engine 4, compares it with the opening degree $\theta_0$ at that moment detected by an unillustrated detecting means and gives to the motor driving circuit, the necessary pulse number and the direction of revolution so that the stepping motor 14 is driven in order to attain the proper throttle valve opening degree $\theta_F$. Thus, the throttle valve opening degree $\theta_F$ to give the desired pressure difference $\Delta P_F$ and the desired air flow quantity $QA_F$ is realized.

Figure 8:
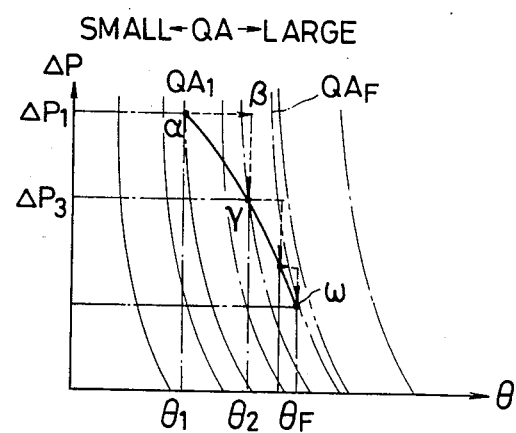

FIG. 8, where the abscissa represents the throttle valve opening degree $\theta$ and the ordinate the pressure difference ΔP in logarithmic scales, shows the air flow quantity characteristic in the case where the air flow quantity QA is a parameter and the values of QA(QA map) in response to the respective combinations of the values ΔP and $\theta$ digitally plotted are memorized. In this case, the desired air flow quantity $QA_F$ becomes necessary by the depression of the accelerator pedal 1 from the position $\alpha$ ($\Delta P_1, \theta_1, QA_1$) but, if the changing amount of the throttle valve opening degree $\theta$ is to be decided on the basis of the quantitative relation between $QA_1$ and $QA_F$, $\theta$ changes from $\theta_1$ to $\theta_2$ and tends to advance from the position $\alpha$ to the position $\beta$, and arrives at the position $\gamma$ because the flow path resistance within the intake tube 11 decreases by the increase of the opening degree of throttle valve 12. Here, the computer 3 computes the air flow quantity $QA_3$ at the position $\gamma$ and, in case $QA_3$ is not the desired air flow quantity $QA_F$, this action will be repeated. Thus, the desired air flow quantity $QA_F$ is attained at the position $\omega$. Also in this case, the actual control is effected as shown with the real line in FIG. 8.

Figure 9:
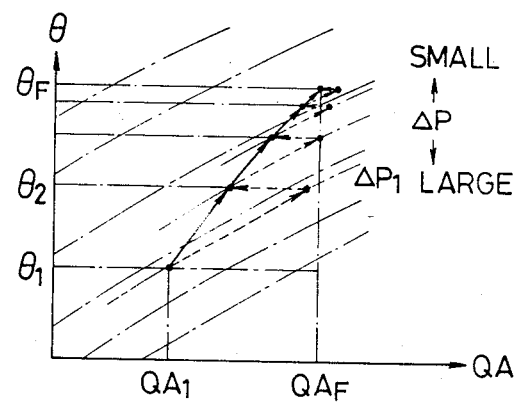

Similarly, in case the air flow quantity QA is represented as an abscissa and the opening degree $\theta$ as a ordinate in logarithmic scales as shown in FIG. 9, and the throttle valve opening degree $\theta$ is increased as a function of the difference between the actual pressure difference and the desired pressure difference in accordance with the air flow quantity characteristic when pressure difference ΔP is taken as its parameter, the desired air flow quantity $QA_F$ is obtained in the way shown with the real line. In this case, the values of pressure difference ΔP (ΔP map) corresponding to the respective combinations between the throttle valve opening degree $\theta$ and air flow quantity QA when $\theta$ and QA are digitally plotted are stored in the computer 3.

By the way, the control of the air flow quantity using the above $\theta$ map, QA map or ΔP map was described for the case of increasing the air flow quantity. It functions, however, similarly also in the case of decreasing the air flow quantity and, as the control is always effected for comparing directly or indirectly the air flow quantity at the present time point and the desired air flow quantity in case the desired air flow quantity is continuously changing, it is able to be efficiently effected.

Figure 10:
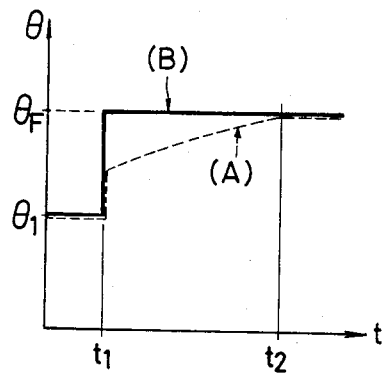
FIGS. 10, 11 and 12 are diagrams showing the control status of the throttle valve opening degree, air flow quantity passing the throttle valve and air flow quantity to be supplied to a cylinder.
Figure 11:
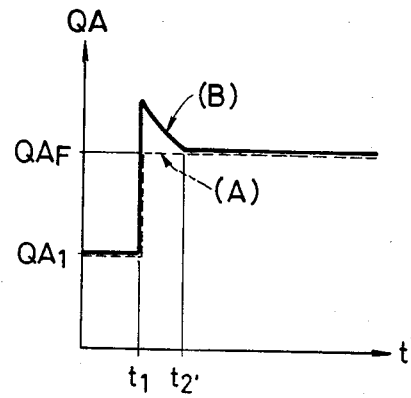
Figure 12:
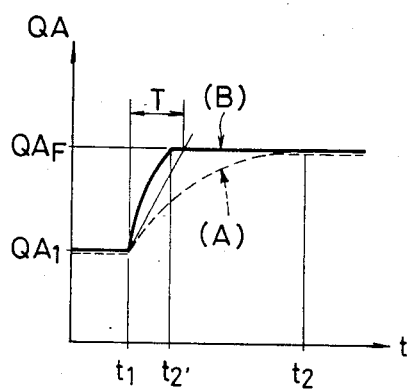

As described above, in the control of the air flow quantity using any one of $\theta$ map, QA map or $\Delta P$ map, the throttle valve opening degree $\theta$ is adjusted from $\theta_1$ to $\theta_F$ during the time length $(t_2 - t_1)$ as shown with the broken line (A) in FIG. 10 and the air flow quantity QA passing within the intake tube 11 is made to arrive substantially instantaneously to the desired value $QA_F$ as shown with the broken line (A) in FIG. 11. However, because of the delay factors existing in the intake system of engine or the time delay of the change of the manifold pressure $P_M$ caused by the inner volume of the intake manifold and the air flow quantity $QA_C$ with which the cylinder sucks are proportional to the product of this manifold pressure $P_M$ and the revolution number N of the engine, the air flow quantity $QA_C$ with which the cylinder sucks has a time delay with respect to the air flow quantity passing within the intake tube 11. Accordingly, even when the air flow quantity $QA_F$ necessary for the engine is controlled so as to pass within the intake tube 11, the air flow quantity $QA_C$ with which the cylinder actually sucks does not instantaneously come to be $QA_F$ as shown with the broken line (A) in FIG. 12. This does not cause a substantial problem in case the change from the first air flow quantity $QA_1$ to the desired quantity $QA_F$ is small but, in case this change is large, it causes the delay of the engine response and deteriorates the driving feeling of the automobile. Here, the relation between QA and $QA_C$ is able to be approximately expressed by the following equations:

$$\frac{QA_C}{QA} = \frac{1}{TS + 1}, \quad T = K \cdot \frac{V_M}{N} \quad (1)$$

where T represents the time delay constant (seconds), K the constant, $V_M$ the volume of the manifold, N the revolution number of the engine and S the Laplace operator. According to these equations, when the air flow quantity to pass within the intake tube 11 is changed stepwise or as shown in FIG. 11(A) by depressing the accelerator pedal 1 stepwise, as the air flow quantity $QA_C$ with which the cylinder sucks changes as shown in FIG. 12(A) gently by the linear time delay, the power response of the engine delays correspondingly. For this, by making the air flow quantity to flow into the intake tube 11 surpass a normal value for a short time for depressing the accelerator pedal 1, the air flow quantity $QA_C$ with which the cylinder is going to suck arrives at the desired value $QA_F$ more quickly (refer to FIG. 11(B)). By the way, $QA_C$ is substantially proportional to the absolute pressure $P_M$ of the manifold and the revolution number N of the engine. Namely, $$QA_C = C \cdot P_M \cdot N \text{ (C: the constant according to a kind of the engine)} \quad (2)$$

Further, $P_M$ is the value of when the pressure difference $\Delta P$ between the up- and down-streams of the throttle valve 12 is subtracted from the intake absolute pressure $P_A$ of the upstream side of the throttle valve 12. Namely, $$P_M = P_A - \Delta P \quad (3)$$

From the equations (2) and (3), $$QA_C = C(P_A - \Delta P)N \quad (4)$$

Figure 13:
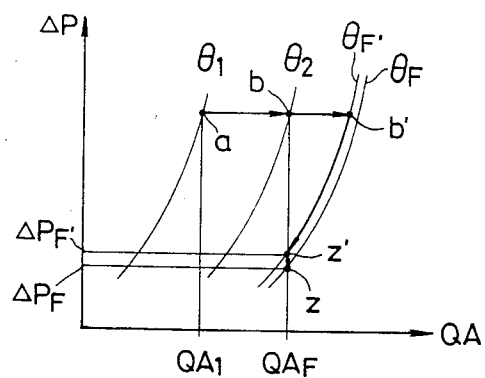
FIG. 13 is an explanatory view of control by an estimated opening degree of the throttle valve.

Thus, when the air flow quantity is desired to quickly change from $QA_1$ to the desired value $QA_F$ in FIG. 13, because the speed of the change is sufficiently quick in comparison with the change of the revolution number N of the engine and the revolution number of the engine during the transit time is thought to be substantially constant, from the equation (4), $$QA_1 = C(P_A - \Delta P_1)N \quad (6)$$

$$QA_F = C(P_A - \Delta P_F)N \quad (6) \text{ hold, and}$$

$$\Delta P_F = P_A - \frac{QA_F}{QA_1}(P_A - \Delta P_1) \quad (7)$$

is obtained. This signifies that the pressure difference is to be $\Delta P_F$ when the air flow quantity is changed from $QA_1$ to $QA_F$ when the revolution number N is supposed to be constant. The throttle valve opening degree to give the air flow quantity $QA_F$ in this case is computed to be $\theta_F$ from $QA_F$ and $\Delta P_F$. Accordingly, when a necessary air flow quantity is changed from $QA_1$ to $QA_F$ by depressing the accelerator pedal 1, if the opening degree $\theta_F$ is simultaneously commanded to set the throttle valve 12 from the computer 3, the adjusting operation is effected from the point a to the point b' and further to the point z' along the progress of time in FIG. 13, the air flow quantity to pass within the intake tube 11 comes temporarily to be a value larger than the desired value $QA_F$ as shown in FIG. 11(B), and the air flow quantity $QA_C$ with which the cylinder sucks arrives to $QA_F$ in a shorter time as shown with the real line (B) in FIG. 12. Here, because, strictly seaking, $\theta_{F'}$ is different from $\theta_F$, a control error occurs if $\theta_{F'}$ is maintained for a long time. Accordingly, after the air flow quantity has arrived at the desired value $QA_F$, the error is eliminated by commanding the throttle valve 12 to be set at the opening degree $\theta_F$ determined by the pressure difference at the present time point and the desired air flow quantity and the air flow quantity $QA_F$ by the correct throttle valve opening degree $\theta_F$ is obtained. This time length or $(t_{2'} - t_1)$ is able to make a function of the time constant T because the delay time of the supply of $QA_C$ is determined by the time constant T of the equation (1) and this delay time is so extremely short as to be 0.1 sec. through 0.3 sec. and is shorter when N is larger to be advantageous from the point of view of the flow quantity error. In case the action speed of the throttle valve 12 is comparatively slow, it is preferred to maintain the command value $\theta_{F'}$ or not to return to the normal control until the actual opening degree of the throttle valve 12 arrives at the desired value $\theta_{F'}$. The above explanation is made for the case where the air flow quantity is increased, but the adjusting operation is able to be similarly effected also in the case of decreasing the air flow quantity. Further, at the estimate of the throttle valve opening degree $\theta_{F'}$, it is possible to more quickly bring the air flow quantity $QA_C$ with which the cylinder sucks to $QA_F$ by bringing the desired air flow quantity instantaneously to a value larger than $QA_F$ and in this case, the differential value of the command value of the air flow quantity is advantageously used for the control. Thus, by controlling the air flow quantity to pass within the intake tube 11 by estimating the desired opening degree, the air flow quantity is quickly brought to the desired value $QA_F$ and the responsiveness of the engine is able to be improved.

A stepping motor is used to adjust the throttle valve opening degree $\theta$ in the above explanation but, by detecting the opening degree $\theta$ with a rotary encoder, potentiometer and the like and putting the signal into the computer, the air flow quantity may be controlled with a servomechanism using a direct or alternating current motor as a motor to adjust the opening degree. Further, the control speed is able to be optionally preset by the algorithm of the computer or the driving speed of the motor to be used. Because the fuel supply quantity and air flow quantity are controlled by the computer, the controls of the engine revolution speed, vehicle speed, air-fuel ratio and the like and various controls such as the optimum control of the engine and the like may be effected only with the formation of the present invention by changing the program.

I claim:

1. A fuel supply device for internal combustion engines having an air supply quantity controlling system comprising:

a computer having therein a memory for storing (a) an air flow quantity characteristic related to the pressure difference between the upstream and downstream sides of a throttle valve, (b) an air flow quantity which passes through said throttle valve and (c) a throttle valve opening degree setting;

an actuator for adjusting the opening degree setting of said throttle valve, said actuator being controlled by said computer to control the air flow quantity to be supplied to said internal combustion engine;

a plurality of values of the throttle valve opening degree setting corresponding to the combinations of the (a) maximum air flow value stored in said memory which is smaller than a desired air flow quantity value at the current point in time, (b) the maximum pressure difference value stored in said memory which is smaller than said pressure difference value at the current point in time, (c) the minimum air flow quantity value stored in said memory which is larger than the desired air flow quantity value at said current point in time, and (d) the minimum pressure difference value stored in said memory which is larger than said pressure difference value at said current point in time being read out of said memory means by accessing said air flow quantity characteristic to said memory;

a desired throttle valve opening degree setting being computed in said computer by an interpolation process; and said throttle valve being adjusted by said actuator to move to said desired throttle valve opening degree setting.

2. A fuel supply device for internal combustion engines having an air supply quantity controlling system comprising:

a computer having therein a memory for storing (a) an air flow quantity characteristic related to the pressure difference between the upstream and downstream sides of a throttle valve, (b) an air flow quantity passing through said throttle valve, and (c) a throttle valve opening degree setting;

an actuator for adjusting the opening degree setting of said throttle valve, said actuator being controlled by said computer to control the air flow quantity to be supplied to said internal combustion engine; and a plurality of air flow quantity values corresponding to the combinations of (a) the maximum throttle valve opening degree setting value stored in said memory which is smaller than the throttle valve opening degree value setting at the current point in time, (b) the maximum pressure difference value stored in said memory which is smaller than said pressure difference value at said current time, (c) the minimum throttle valve opening degree value setting stored in said memory which is larger than the throttle valve opening degree value at said current time, and (d) the minimum pressure difference value stored in said memory which is larger than said pressure difference value at said curent time being read out of said memory by accessing to said memory said air flow quantity characteristic, said air flow quantity value at said current time being computed by said computer by an interpolation process, said throttle valve opening degree setting being adjusted by said actuator so that said air flow quantity value at the current time is at a desired air flow quantity value.

3. A fuel supply device for internal combustion engines having an air supply quantity controlling system comprising:

a computer having therein a memory for storing (a) an air flow quantity characteristic related to the pressure difference between the upstream and downstream sides of a throttle valve, (b) an air flow quantity passing through said throttle valve, and (c) a throttle valve opening degree setting;

an actuator for adjusting the opening degree of said throttle valve, said actuator being controlled by said computer to control the air flow quantity to be supplied to said internal combustion engine;

a plurality of pressure difference values corresponding to the combinations of the maximum air flow quantity value stored in said memory which is smaller than a desired air flow quantity value at a given time, the maximum throttle valve opening degree value setting stored in said memory which is smaller than the throttle valve opening degree value at said given time, the minimum air flow quantity value stored in said memory which is larger than the desired air flow quantity value at said given time, and the minimum throttle valve opening degree setting value stored in said memory which is larger than the throttle valve opening degree setting value at said given time being read out of said memory by accessing said air flow quantity characteristic in said memory, said pressure difference value at said given time being computed by said computer by an interpolation process, the throttle valve opening degree setting being adjusted so that said pressure difference value at said given time is the desired pressure difference value.

4. A fuel supply device for an internal combustion engine according to any one of claims 1-3 wherein when the difference between said air flow quantity value at said given time and said desired air flow quantity value is large, the desired pressure difference value is first computed by said computer and an estimated value of the throttle valve opening degree setting is computed from said desired air flow quantity value and said desired pressure difference value, said throttle valve opening degree setting being adjusted to one of the desired throttle valve opening degree setting value and the estimated throttle valve opening degree value setting.

* * * * *